United States Patent
Liu

(10) Patent No.: US 8,665,262 B2
(45) Date of Patent: Mar. 4, 2014

(54) DEPTH MAP ENHANCING METHOD

(75) Inventor: Yen-Tzu Liu, Pingzhen (TW)

(73) Assignee: Chunghwa Picture Tubes, Ltd., Bade, Taoyuan County (TW)

( * ) Notice: Subject to any disclaimer, the term of this patent is extended or adjusted under 35 U.S.C. 154(b) by 576 days.

(21) Appl. No.: 12/972,429

(22) Filed: Dec. 18, 2010

(65) Prior Publication Data

US 2012/0013603 A1    Jan. 19, 2012

(30) Foreign Application Priority Data

Jul. 15, 2010    (TW) .............................. 99123355 A

(51) Int. Cl.
*G06T 15/00*    (2011.01)
(52) U.S. Cl.
USPC .......................................................... 345/419
(58) Field of Classification Search
USPC .................. 345/419–427, 582–588, 629–641
See application file for complete search history.

(56) References Cited

U.S. PATENT DOCUMENTS

| | | | | |
|---|---|---|---|---|
| 6,052,124 A | * | 4/2000 | Stein et al. ..................... | 345/419 |
| 6,285,779 B1 | * | 9/2001 | Lapidous et al. ............. | 382/106 |
| 2003/0206652 A1 | * | 11/2003 | Nister ........................... | 382/154 |

* cited by examiner

*Primary Examiner* — Xiao M. Wu
*Assistant Examiner* — Charles Tseng
(74) *Attorney, Agent, or Firm* — Chih Feng Yeh; Huntington IP Consulting Co., Ltd.

(57) ABSTRACT

The present invention discloses a depth map enhancing method. The method includes steps of obtaining an original depth map and a depth related parameter and storing the original depth map and the depth related parameter into a storage medium; quantifying the gray level of every pixel in the original depth map between 0 and 1 to obtain a plurality of quantified gray levels; raising the depth related parameter to the power of every quantified gray level respectively, subtracting 1, being divided by the value of the depth related parameter subtracting 1 and then being multiplied by a max gray level value to obtain a plurality of depth-relation-enhanced gray levels; and evenly distributing the plurality of depth-relation-enhanced gray levels between 0 and the max gray level value according to the relative proportional relationship among the plurality of depth-relation-enhanced gray levels to obtain a plurality of final gray levels.

7 Claims, 6 Drawing Sheets

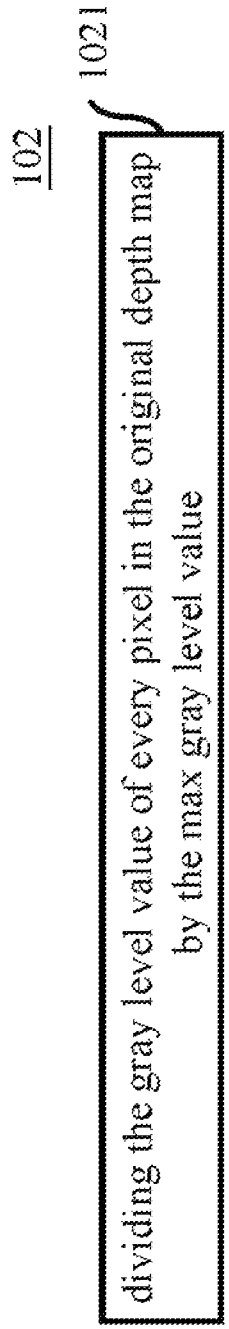

dividing the gray level value of every pixel in the original depth map by the max gray level value

Fig. 2

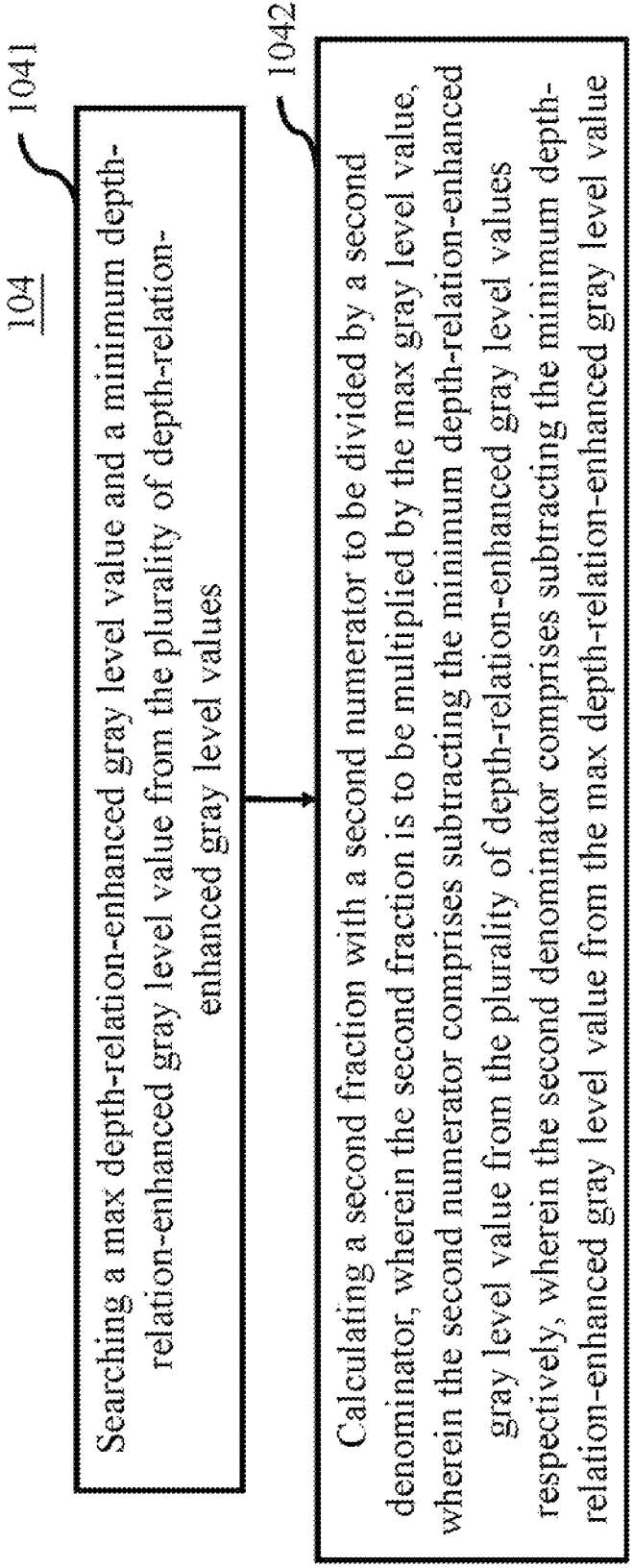

Searching a max depth-relation-enhanced gray level value and a minimum depth-relation-enhanced gray level value from the plurality of depth-relation-enhanced gray level values Calculating a second fraction with a second numerator to be divided by a second denominator, wherein the second fraction is to be multiplied by the max gray level value, wherein the second numerator comprises subtracting the minimum depth-relation-enhanced gray level value from the plurality of depth-relation-enhanced gray level values respectively, wherein the second denominator comprises subtracting the minimum depth-relation-enhanced gray level value from the max depth-relation-enhanced gray level value

Fig. 3

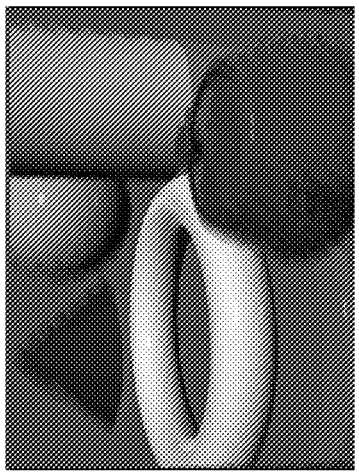
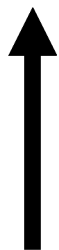
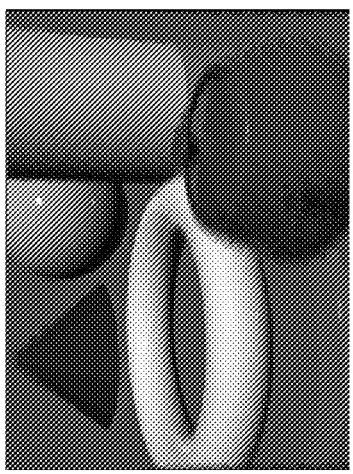
Fig. 6
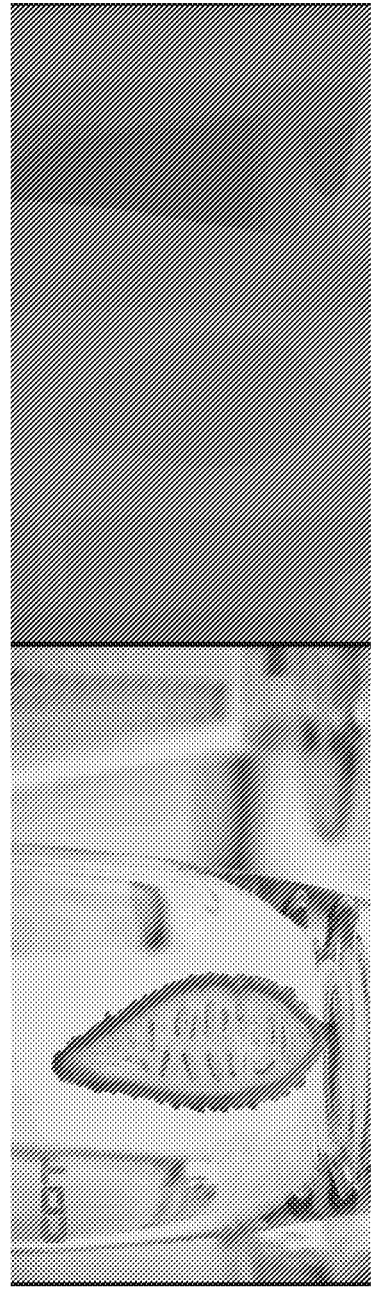
Fig. 7

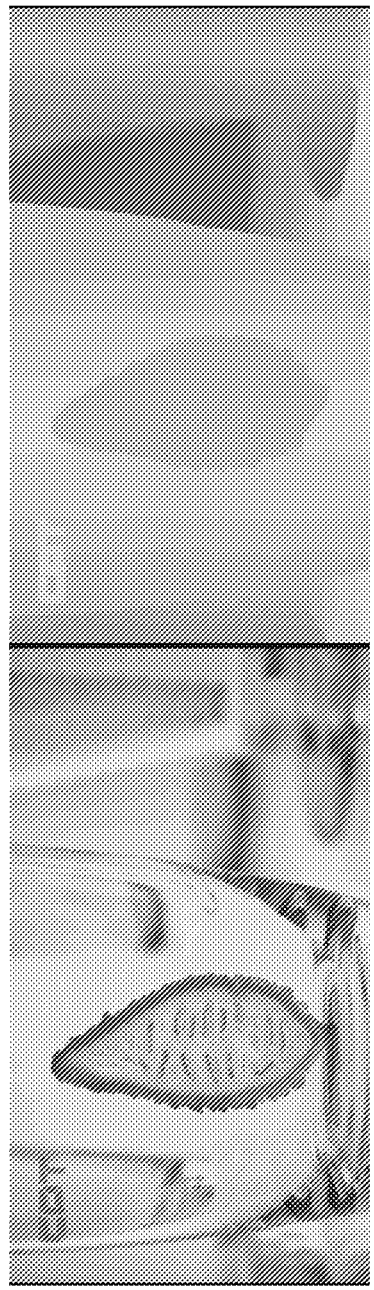
Fig. 8
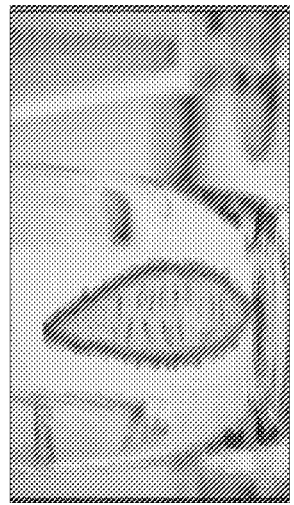
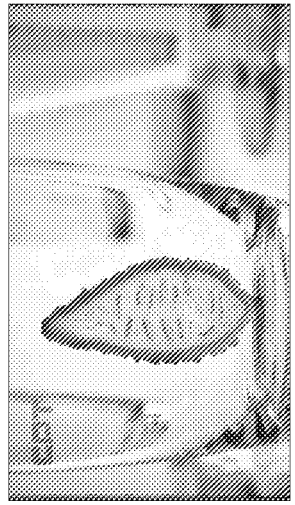
Fig. 9

DEPTH MAP ENHANCING METHOD

CROSS-REFERENCE TO RELATED APPLICATION

This present application claims priority to TAIWAN Patent Application Serial Number 099123355, filed Jul. 15, 2010, which is herein incorporated by reference.

TECHNICAL FIELD

The present invention relates to a depth map, and more particularly to a depth map enhancing method.

BACKGROUND OF THE RELATED ART

Three dimensional (3D) stereoscopic image display technology has become the dominant trend in the field of image display technology. The principle of the three dimensional stereoscopic imaging is using the left eye and right eye images having parallax to constitute a stereoscopic image with depth-of-field vision. In the current market, the 3D animations and games have included space information as designed, such that the space information can be utilized to be transformed into depth information easily. To generate a 3D stereoscopic image, it is used that gray level values of a 2D image are generally valued from 0 to 255 which represent the nearest image portion to the farthest one, and a depth map is establish which the size of the depth map is completely same as the corresponding 2D image, thereby a 3D stereoscopic image can be generated.

Traditionally, the method for generating a depth map can be divided to manual method, automatic method and semi-automatic method. The depth value is determined manually in the manual method. In the semi-automatic method, the objects are first selected manually, and then the approximate depth value information is calculated by an object tracking algorithm. In the automatic method, the depth map is generated by animation software, for example 3DS Max or Maya, or is calculated from two different pictures with different angles of view. For instance, in order to generate the depth map manually by using tool software such as Photoshop, follow these steps:

1. Establish eye points;
2. Analyze how many 3D objects should be divided;
3. Define the gray level values;
4. Select or divide 3D objects;
5. Use Polygon Lasso Tools and Linear Gradient to make gray level maps of other 3D objects;
6. Use a layer with gray level value 000 as a background of these 3D objects;
7. Obtain the depth map and save the depth map as the uncompressed BMP image format.

The current transformation technology for CG animation or video usually utilizes the automatic method to generate the depth value information because the generated depth information is more accurate. In the prior technology, the calculated depth map is transformed into the depth information to generate images at different viewing angles, however, the prior technology does not consider that the conventionally generated depth map may result in the relative distances among different objects being very small, i.e. the colors of the objects are very similar and the contrast is low. Therefore, the stereoscopic effect may not be so pronounced or the details of the images cannot be shown more clearly.

Moreover, when the depth information of the 2D depth map overly concentrates in certain region, i.e. the gray level values of the depth map are distributed unevenly, the foreground may be overly fused with the background, and the stereoscopic perception thereof will be poor. This situation often happens in the depth maps generated by using the semi-automatic method or the automatic method. If the shortcomings that the depth values overly concentrate on certain region can be improved, the 3D stereoscopic effect becomes manifest.

Therefore, there is still a need for a technical solution for solving the aforementioned problems of the conventional depth map.

SUMMARY

To solve the aforementioned problems of the conventional depth map that the depth information overly concentrates and the relative distance among different objects is small, the present invention provides a depth map enhancing method.

In one aspect, the present invention discloses a depth map enhancing method, comprising obtaining an original depth map and a depth related parameter and storing the original depth map and the depth related parameter into a storage medium; quantifying a gray level value of every pixel in the original depth map between 0 and 1 to obtain a plurality of quantified gray level values; raising the depth related parameter to the power of every the quantified gray level value respectively, subtracting 1, and then divided by the value of the depth related parameter subtracting 1, and multiplied by a max gray level value to obtain a plurality of depth-relation-enhanced gray level values; and evenly distributing the plurality of depth-relation-enhanced gray level values between 0 and the max gray level value according to the relative proportional relationship among the plurality of depth-relation-enhanced gray level values to obtain a plurality of final gray level values.

One advantage of the present invention is to provide the depth map enhancing method used to generate stereoscopic image with higher contrast between the foreground and the background.

Another advantage of the present invention is to provide the depth map enhancing method used to generate stereoscopic image with better distance perception between the objects in the foreground and the background.

Still another advantage of the present invention is to provide the depth map enhancing method for preventing the stereoscopic effect of the generated stereoscopic image from being weakened as a result of uneven distribution of the gray level values in the depth map.

Yet another advantage of the present invention is that the algorithm described in the depth map enhancing method according to the present invention is simple and able to be implemented in multimedia players, and the present invention provides a quick calculation and efficient process.

These and other advantages will become apparent from the following description of preferred embodiments taken together with the accompanying drawings and the appended claims.

BRIEF DESCRIPTION OF THE DRAWINGS

The present invention may be understood by some preferred embodiments and detailed descriptions in the specification and the attached drawings below. The identical reference numbers in the drawings refer to the same components in the present invention. However, it should be appreciated that all the preferred embodiments of the invention are only for illustrating but not for limiting the scope of the Claims and wherein:

FIG. 2 illustrates a flow chart of a depth map enhancing method in accordance with one embodiment of the present invention;

FIG. 3 illustrates a flow chart of a depth map enhancing method in accordance with one embodiment of the present invention;

FIG. 6 illustrates stereoscopic images generated by using the original depth map generated by prior art and the depth map processed by the depth map enhancing method according to the present invention;

FIG. 7 illustrates another 2D original image and another original depth map generated by prior art;

FIG. 8 illustrates another 2D original image and the depth map generated by processing the original depth map in FIG. 7 by using the depth map enhancing method according to the present invention;

FIG. 9 illustrates stereoscopic images generated by using another original depth map generated by prior art and the depth map processed by the depth map enhancing method according to the present invention.

DETAILED DESCRIPTION

The invention will now be described with the preferred embodiments and aspects and these descriptions interpret structure and procedures of the invention only for illustrating but not for limiting the Claims of the invention. Therefore, except the preferred embodiments in the specification, the present invention may also be widely used in other embodiments.

In one embodiment of the present invention, the present invention discloses a depth map enhancing method. In the stereoscopic image processing technology, a 2D original image and a depth map can be utilized to generate stereoscopic images. The depth map is utilized as shift information, i.e. the descriptions of the farness or the nearness information of an object. In the depth map, the gray level valued from 0 to 255 is used to represent the nearest image portion to the farthest one. The nearest information of the object is represented by gray level value 255 and the farthest information of the object is represented by gray level value 0. The depth map enhancing method of the present invention can improve the depth maps generated by prior art and render the stereoscopic images generated by the improved depth map to have higher contrast between the foreground and the background and better distance perception between the objects in the foreground and in the background, such that the stereoscopic degree of the generated stereoscopic images can be apparently improved.

Figure 10:
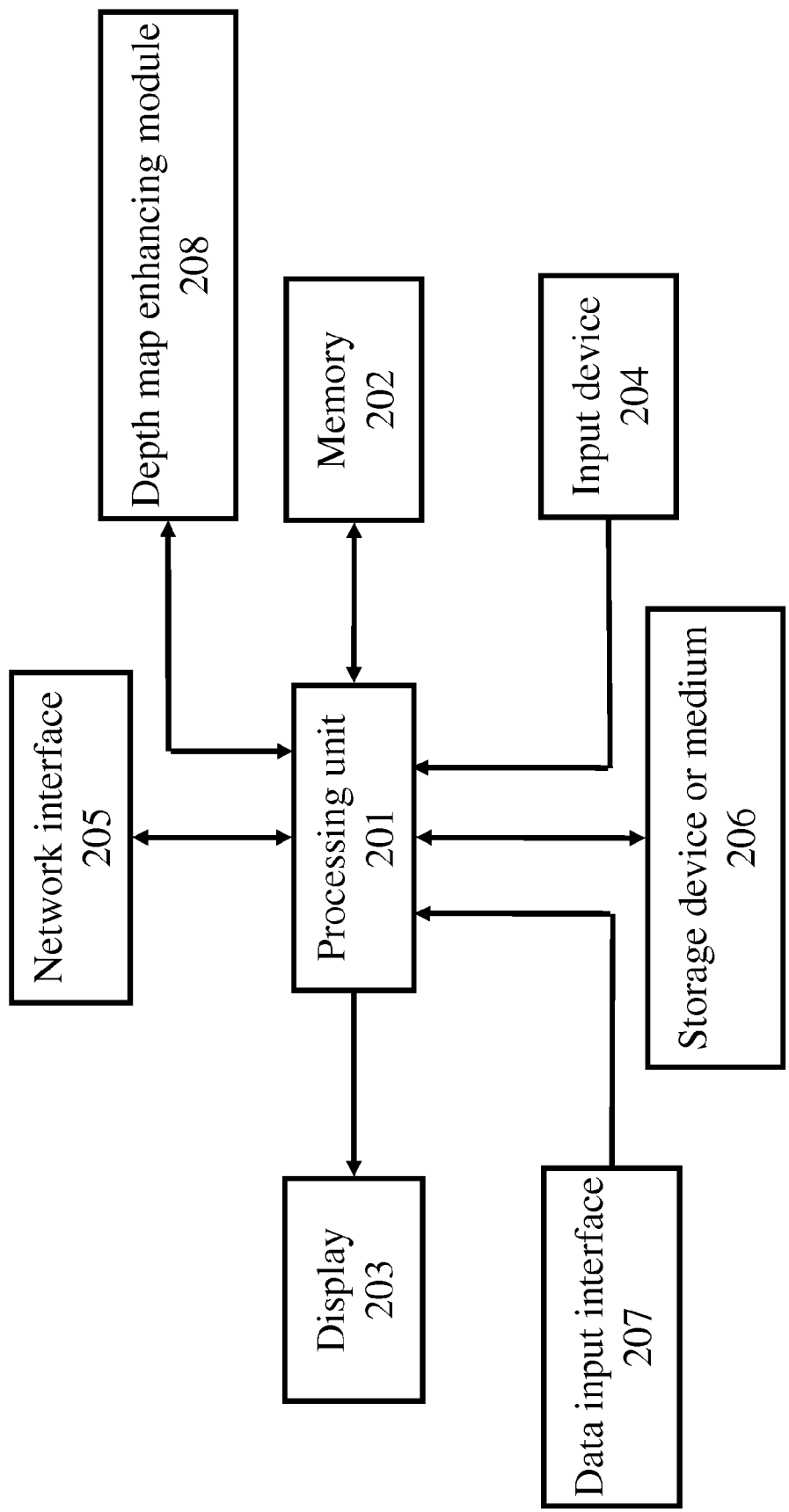
FIG. 10 illustrates a block diagram of an example of a computer system for implementing the method of an embodiment of the present invention.

To achieve the purpose of the present invention, the depth map enhancing method of the present invention can be implemented in a computer system shown in FIG. 10 to perform or execute related instructions. The computer system is shown for illustrating but not for limiting the present invention. As shown in FIG. 10, the computer system includes a processing unit 201, a memory 202 electrically coupled to the processing unit 201, and a display 203 coupled to the processing unit 201 for displaying information. An input device 204 is electrically coupled to the processing unit 201 to input instructions. The input device 204 may include a keyboard, a keypad or a mouse. A network interface 205 is electrically coupled to the processing unit 201. The network interface 205 may include a wired network interface or a wireless network interface. A storage device or medium 206 including a hard disk drive, a floppy drive or a nonvolatile memory is electrically coupled to the processing unit 201. A data input interface 207 is electrically coupled to the processing unit 201. The data input interface 207 may include a wired data input interface and a wireless data input interface. The wired data input interface may include universal serial bus (USB) and a high speed transmission interface IEEE1394. The wireless data input interface may include BLUETOOTH and infrared (IR). A depth map enhancing module 208, which generally is software stored in the storage device or medium 206, is activated under a call from the processing unit 201 to perform the depth map enhancing method described in the following embodiments.

Figure 1:
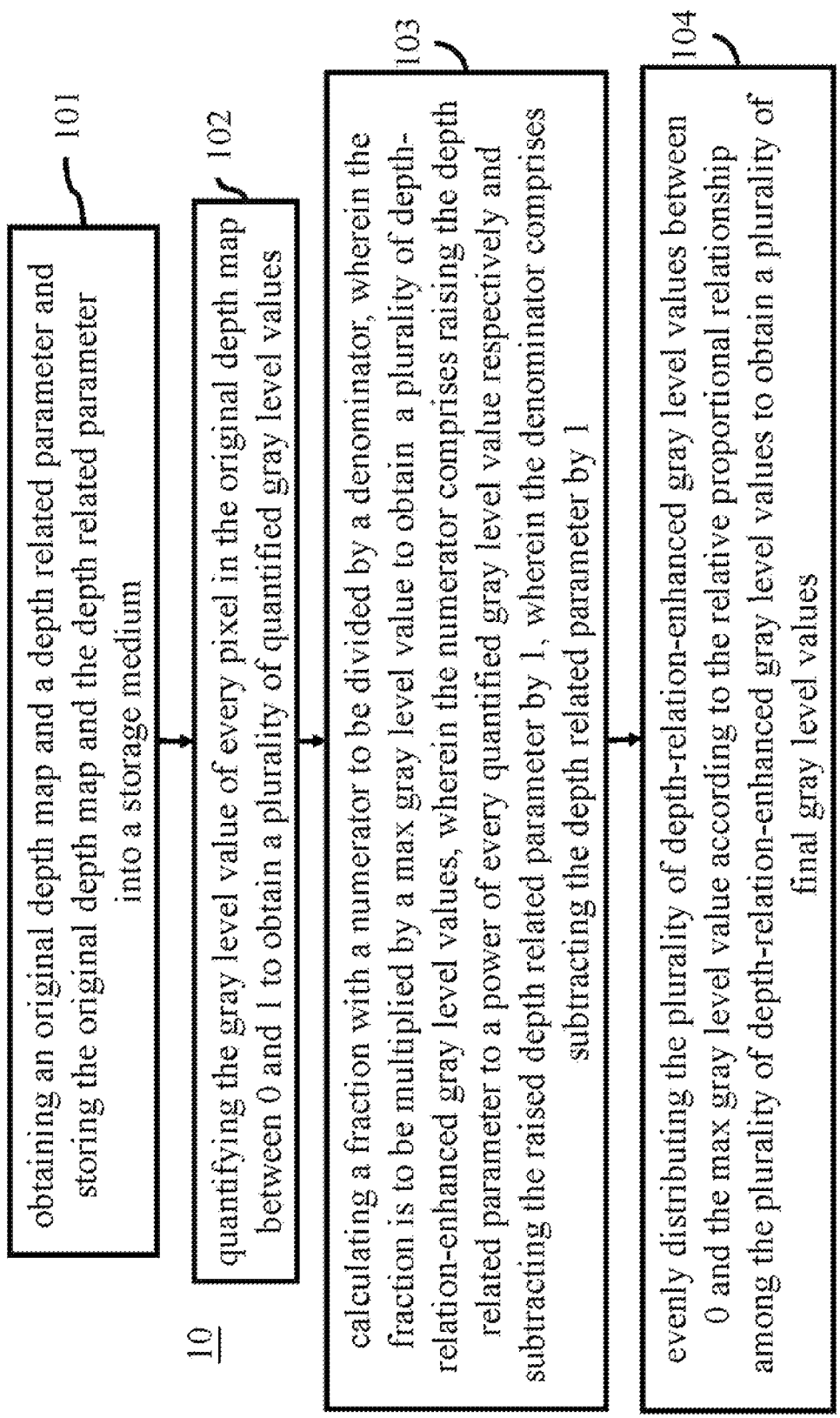
FIG. 1 illustrates a flow chart of a depth map enhancing method in accordance with one embodiment of the present invention.

In one embodiment of the present invention, as shown in FIG. 1, the depth map enhancing method 10 of the present invention includes obtaining an original depth map and a depth related parameter and storing the original depth map and the depth related parameter into a storage medium in step 101. The original depth map and the depth related parameter can be obtained by inputting through the network interface 205 or the data input interface 207. In one embodiment, the original depth map and the depth related parameter can be inputted through the data input interface 207 and stored into the storage medium. In one embodiment, the depth related parameter a may be a number larger than 1. In one embodiment, the depth related parameter a may preferably be about 40 to 70. Subsequently, as shown in FIG. 1, the gray level value of every pixel in the original depth map is quantified between 0 and 1 by the depth map enhancing module 208 to obtain a plurality of quantified gray level values in step 102. In one embodiment, step 102 includes step 1021. In step 1021, the gray level value of every pixel in the original depth map is divided by a max gray level value. In one embodiment, the max gray level value is 255.

In one embodiment, algorithm used in step 1021 is described as follows:

$$Q_{i,j} = \frac{A_{i,j}}{255}$$

For $1 \leq i \leq H$, $1 \leq j \leq W$ wherein A is the gray level value of the original depth map; Q is the quantified gray level value of the depth map; H is the length of the original image; and W is the width of the original image.

Then, as shown in FIG. 1, a fraction with a numerator to be divided by a denominator is calculated, where the fraction is to be multiplied by a max gray level value, where the numerator includes raising the depth related parameter to a power of every quantified gray level value respectively and subtracting the raised depth related parameter by 1, where the denominator includes subtracting the depth related parameter by 1 by means of the depth map enhancing module 208 to obtain a plurality of depth-relation-enhanced gray level values in step 103. The depth-relation-enhanced gray level values are used to enhance contrast level among the gray level value of every pixel and provide more accurate relative distances among different objects, i.e. make the dark pixels darker and the light pixels lighter. In one embodiment, the max gray level value may be 255.

In one embodiment, step 103 can be as follows:

$$A'_{i,j} = \frac{\alpha^{Q_{i,j}} - 1}{\alpha - 1} \times 255$$

For 1≤i≤H, 1≤j≤W wherein A' is the depth-relation-enhanced gray level value of the depth map; Q is the quantified gray level value of the depth map; α is the depth related parameter; H is the length of the original image; and W is the width of the original image.

Subsequently, as shown in FIG. 1, the plurality of depth-relation-enhanced gray level values are evenly distributed between 0 and the max gray level value according to the relative proportional relationship among the plurality of depth-relation-enhanced gray level values to obtain a plurality of final gray level values in step 104. In one embodiment, step 104 includes step 1041 and step 1042. In step 1041, a max depth-relation-enhanced gray level value and a minimum depth-relation-enhanced gray level value are obtained from the plurality of depth-relation-enhanced gray level values. In step 1042, a second fraction with a second numerator to be divided by a second denominator is calculated, wherein the second fraction is to be multiplied by the max gray level value, where the second numerator includes subtracting the minimum depth-relation-enhanced gray level value from the plurality of depth-relation-enhanced gray level values respectively, where the second denominator includes subtracting the minimum depth-relation-enhanced gray level value from the max depth-relation-enhanced gray level value.

In one embodiment, step 1042 can be as follows:

$$A''_{i,j} = \frac{(A'_{i,j} - MinVal)}{MaxVal - MinVal} \times 255$$

For 1≤i≤H, 1≤j≤W wherein A" is the evenly distributed gray level value of the depth map; A' is the depth-relation-enhanced gray level value of the depth map; MinVal is the minimum of A'; MaxVal is the maximum of A'; H is the length of the original image; and W is the width of the original image.

The depth map generated from the plurality of gray level values finally obtained by the depth map enhancing module 208 in step 104 can be utilized with a 2D original image to generate the stereoscopic image. The shift amount of every pixel in the 2D original image can be determined according to the gray level value of every pixel in the depth map obtained in step 104 to generate the stereoscopic image. The depth map processed by the method of the present invention can enable the generated stereoscopic image to provide higher contrast between the foreground and the background and better distance perception between the objects in the foreground and in the background. Several examples of implementation will be described in the following to illustrate the effect of the depth map enhancing method of the present invention. It should be noted that any examples described herein are only for illustrating not for limiting the present invention.

Figure 4:
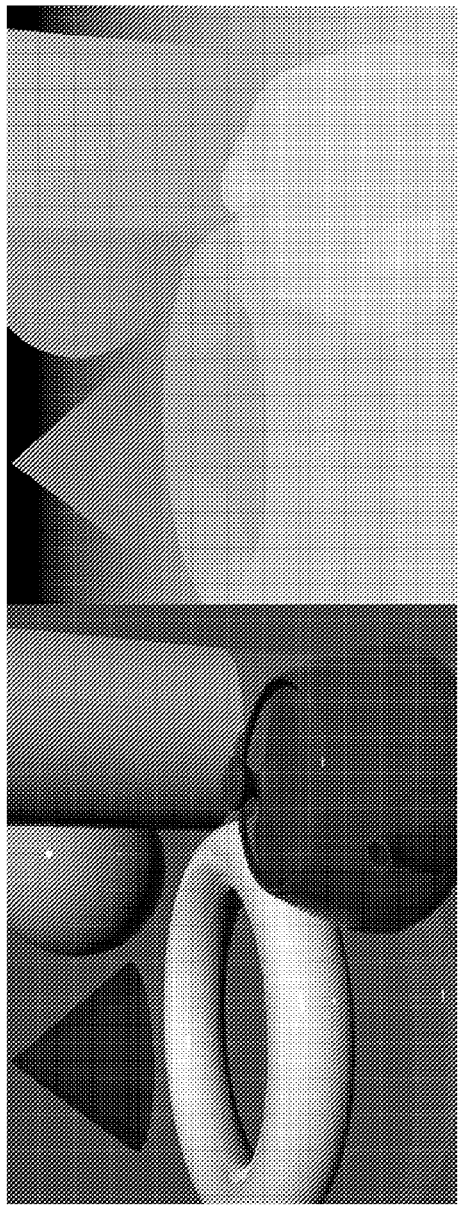
FIG. 4 illustrates a 2D original image and an original depth map generated by prior art.
Figure 5:
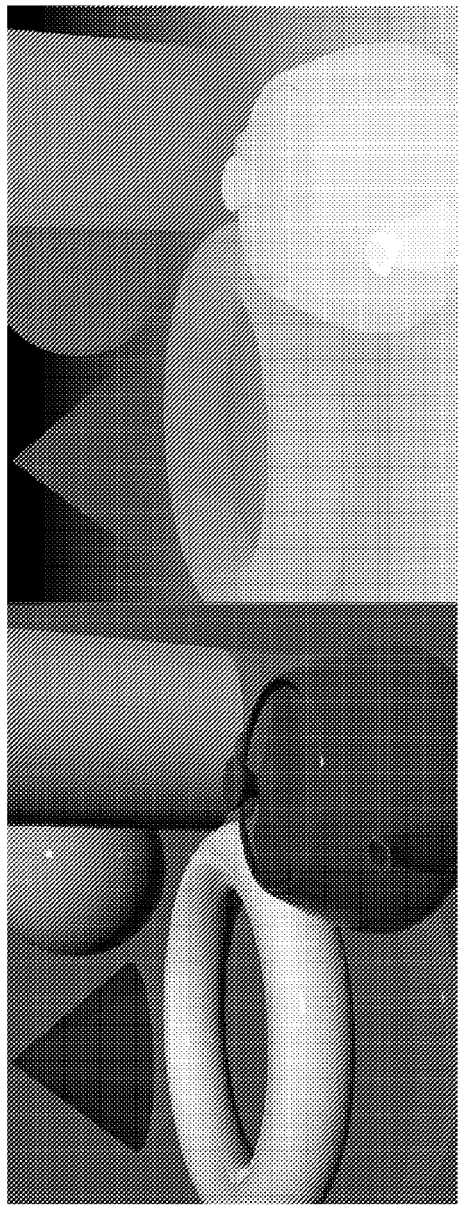
FIG. 5 illustrates the 2D original image and the depth map generated by processing the original depth map in FIG. 4 by using the depth map enhancing method according to the present invention.

FIGS. 4-9 illustrate the examples of implementation of the depth map enhancing method of the present invention. In one embodiment, the left figure in FIG. 4 is the 2D original image and the right figure in FIG. 4 is the original depth map generated by using prior art. The left figure in FIG. 5 is the 2D original image and the right figure in FIG. 5 is the depth map generated by processing the original depth map in FIG. 4 by using the depth map enhancing method according to the present invention with the depth related parameter (α) of 50. Comparing the right figure in FIG. 4 with the right figure in FIG. 5, it should be noted that the color of the spout of the teapot in the original depth map, i.e. the right figure in FIG. 4 is almost the same as the color of the body of the teapot and the outline of the body of the teapot is not clear.

However, the color of the spout of the teapot processed by the depth map enhancing method according to the present invention, as shown in the right figure in FIG. 5, becomes whiter and more stereoscopic and the outline of the body of the teapot becomes clear. The left figure in FIG. 6 is a stereoscopic image generated by using the 2D original image and the original depth map in FIG. 4, and the right figure in FIG. 6 is a stereoscopic image generated by using the 2D original image and the depth map processed by the method according to the present invention in FIG. 5. By confirming the left and right figures in FIG. 6 in 3D display, it is demonstrated that the right figure brings more stereoscopic sensation than the left figure.

In another embodiment, the left figure in FIG. 7 is another 2D original image while the right figure in FIG. 7 is another original depth map generated by prior art. The left figure shown in FIG. 8 is the original image same as the right figure in FIG. 7, and the right figure in FIG. 8 is the depth map generated by processing the original depth map in FIG. 7 by using the depth map enhancing method of the present invention with the depth related parameter (α) of 60. Comparing the right figure in FIG. 7 with the right figure in FIG. 8, it should be noted that there is less difference between the foreground and the background of the cup in the original depth map, i.e. the right figure in FIG. 7. The depth map processed by the depth map enhancing method according to the present invention, i.e. the cup shown in the right figure in FIG. 8, shows apparent gradient and the color of the cup becomes whiter and the background remains black. The left figure in FIG. 9 is a stereoscopic image generated by using the 2D original image and the original depth map in FIG. 7 while the right figure in FIG. 9 is a stereoscopic image generated by using the 2D original image and the depth map processed by the method of the present invention in FIG. 8. By confirming the left and right figures in FIG. 9 in 3D display, it is demonstrated that the right figure brings more stereoscopic sensation than the left figure.

Accordingly, the depth map enhancing method provided by the present invention can render the generated stereoscopic image to have higher contrast between the foreground and the background and better distance perception between the objects in the foreground and the background and can prevent the stereoscopic effects of the generated stereoscopic image from being weakened as a result of uneven distribution of the gray level values in the depth map. Further, the algorithm described in the depth map enhancing method according to the present invention is simple and able to be implemented in multimedia players, and the present invention provides a quick calculation and efficient process.

The foregoing description is to describe the embodiments of the present disclosure. It should be appreciated that this embodiment is described for purposes of illustration only, not for limiting, and that numerous alterations and modifications may be practiced by those skilled in the art without departing from the spirit and scope of the invention. It is intended that all such modifications and alterations are included insofar as they come within the scope of the invention as claimed or the equivalents thereof.

What is claimed is:

1. A depth map enhancing method, comprising:
   obtaining an original depth map and a depth related parameter, and storing said original depth map and said depth related parameter into a storage medium;
   quantifying a gray level value of every pixel in said original depth map between 0 and 1 to obtain a plurality of quantified gray level values;
   calculating a fraction with a numerator to be divided by a denominator, wherein said fraction is to be multiplied by a max gray level value to obtain a plurality of depth-relation-enhanced gray level values, wherein said numerator comprises raising said depth related parameter to a power of each of said plurality of quantified gray level values respectively and subtracting said raised depth related parameter by 1, wherein said denominator comprises subtracting said depth related parameter by 1; and
   evenly distributing said plurality of depth-relation-enhanced gray level values between 0 and said max gray level value according to a relative proportional relationship among said plurality of depth-relation-enhanced gray level values to obtain a plurality of final gray level values.

2. The method of claim 1, wherein said max gray level value is 255.

3. The method of claim 1, wherein said depth related parameter is a number greater than 1.

4. The method of claim 3, wherein said depth related parameter is between 40 and 70.

5. The method of claim 1, wherein the step of obtaining said plurality of quantified gray level values further comprises dividing said gray level value of every pixel in said original depth map by said max gray level value.

6. The method of claim 1, wherein the step of obtaining said plurality of final gray level values further comprises obtaining a max depth-relation-enhanced gray level value and a minimum depth-relation-enhanced gray level value from said plurality of depth-relation-enhanced gray level values.

7. The method of claim 6, wherein the step of obtaining said plurality of final gray level values further comprises calculating a second fraction with a second numerator to be divided by a second denominator, wherein said second fraction is to be multiplied by said max gray level value, wherein said second numerator comprises subtracting said minimum depth-relation-enhanced gray level value from said plurality of depth-relation-enhanced gray level values respectively, wherein said second denominator comprises subtracting said minimum depth-relation-enhanced gray level value from said max depth-relation-enhanced gray level value.

* * * * *